United States Patent [19]

Habermann et al.

[11] Patent Number: 5,258,106
[45] Date of Patent: Nov. 2, 1993

[54] ELECTROLYSIS OF ALKALI METAL SULFATES

[75] Inventors: Wolfgang Habermann, Mainz; Werner Bochnitschek, Ludwigshafen; Johann Fritzmann, Heidelberg; Peter Hammes, Ruppertsberg; Theo Proll, Bad Durkheim; Walter Weisbrodt, Deidesheim, all of Fed. Rep. of Germany

[73] Assignee: BASF Aktiengesellschaft, Ludwigshafen, Fed. Rep. of Germany

[21] Appl. No.: 672,284

[22] Filed: Mar. 20, 1991

[30] Foreign Application Priority Data

Mar. 23, 1990 [DE] Fed. Rep. of Germany ....... 4009410

[51] Int. Cl.$^5$ .......................... C25B 1/00; B01D 61/44
[52] U.S. Cl. ...................................... 204/98; 204/104; 204/182.4; 204/296
[58] Field of Search ...................... 204/98, 104, 182.4, 204/301, 252, 296, 96

[56] References Cited

U.S. PATENT DOCUMENTS

| | | | |
|---|---|---|---|
| 3,801,698 | 4/1974 | Lowrance et al. | 204/104 |
| 4,075,068 | 2/1978 | Loest et al. | 204/93 |
| 4,083,768 | 4/1978 | Lee et al. | 204/296 |
| 4,129,484 | 12/1978 | Larsson | 204/101 |

OTHER PUBLICATIONS

Stender et al., "Electrolysis of Aqueous Solutions of Alkali Sulfates." Oct., 1935, pp. 109–135. The Electrochemical Society.
Chem.-Ing.-Tech. 61 (1989) No. 12 933–940.

*Primary Examiner*—John Niebling
*Assistant Examiner*—Arun S. Phasge
*Attorney, Agent, or Firm*—Keil & Weinkauf

[57] ABSTRACT

Alkali metal sulfates are electrolyzed to more concentrated solutions of alkali metal hydroxide and sulfuric acid by using a three-compartment electrodialysis cell at temperatures of $\geq 70°$ to $\geq 150°$ C. and current densities of from 0.5 to 15 kA/m$^2$ using an anion exchange membrane whose polymeric ion exchange matrix comprises a styrene/divinylbenzene copolymer containing very strongly basic quaternary ammonium groups and a hydronium ion blocker, on whose central compartment side is an ion exchange layer or membrane containing tertiary or secondary amino groups.

9 Claims, No Drawings

ELECTROLYSIS OF ALKALI METAL SULFATES

The present invention relates to a process for the electrolysis of alkali metal sulfates to alkali metal hydroxides and sulfuric acid in a three-compartment electrodialysis cell.

The electrolysis of sodium sulfate by the amalgam process produces a 20% by weight sulfuric acid containing about 15% by weight of sodium hydrogen sulfate and sodium amalgam The sodium amalgam formed is converted into sodium hydroxide in separate decomposers, whereas the salt-containing sulfuric acid needs to be worked up in an expensive operation. The energy requirements are very high at 3900–4200 kilowatt hours per tonne (kWh/t) of NaOH. The relatively high energy costs and in particular the problematical mercury are the reasons why this process is not at present being practised in industry.

Recent developments using cation and anion exchange membranes have led to single- or multi-compartment electrolysis or electrodialysis cells An electrolysis cell divided into two compartments by a cation exchange membrane, where the sulfate solution is introduced into the anode compartment, produces an ~10% strength salt-containing sulfuric acid and a 15-25% strength sodium hydroxide solution at current yields of from 65 to 70% The energy consumption is >4000 kWh/t of NaOH. What prevents this process from being used in industry is the uneconomical workup of the dilute, salt-containing sulfuric acid and the low current yields A further idea for a process is electrodialysis in a cell divided into three compartments by a cation exchange membrane and an anion exchange membrane. In this process, the alkali metal sulfate solution flows through the central compartment of the electrodialysis cell At an operating temperature of $+50°$ C. and current densities of from 0.8 to 1 $kA/m^2$ the cathode compartment gives an approximately 15-20% strength alkali metal hydroxide solution and the anode compartment an approximately 5-15% strength sulfuric acid at current yields of from 60 to 80%. The energy consumption is about 4000 kWh/t of NaOH. Obstacles to industrial application, besides the high energy consumption, are the inadequate selectivity and service life of existing commercial anion exchange membranes.

Another electrodialysis process which has been developed involves the use of bipolar membranes. A bipolar membrane firmly combines a cation exchange membrane with an anion exchange membrane See Chem -Ing.-Techn. 61 (1989), 935. The bipolar membrane is separated from the alkali metal sulfate electrolyte by a cation exchange membrane on the anion exchange side and by an anion exchange membrane on the cation exchange side. During electrodialysis, alkali metal cations pass through the cation exchange membrane into the compartment which is bounded by the anion exchange side of the bipolar membrane, while the sulfate ions pass through the anion exchange membrane into the compartment adjoining the cation exchange side of the bipolar membrane. At the same time, water is dissociated in the electric field at the cation/anion exchange membrane phase boundary, producing sodium hydroxide on the anion exchange side of the bipolar membrane and sulfuric acid on the cation exchange side. The electrodialysis process with bipolar membranes is carried out at a temperature of $+45°$ C. and current densities of $\leq 0.5$ $kA/m^2$. According to literature data, the energy consumption is ~1700 kilowatt hours per tonne of NaOH. The unsatisfactory aspect of this process is that the bipolar membranes are not selective, producing only dilute salt-containing sulfuric acids of from 5 to 10% by weight and salt-containing alkali metal hydroxide solutions of from 8 to 10% by weight. In addition there is the significant disadvantage that the charge-carrying, quaternary ammonium groups of the anion exchange side of the bipolar membranes are degraded in the alkali metal hydroxide solution. For that reason this process is not suitable for an industrial workup of alkali metal sulfates into highly concentrated alkali metal hydroxide solutions and sulfuric acid.

It is an object of the present invention to carry out the electrolysis of alkali metal sulfates to alkali metal hydroxides and sulfuric acid in an electrolysis cell partitioned into three compartments by ion exchange membranes in such a way as to produce salt-free alkali metal hydroxides and sulfuric acid in industrially usable concentrations at high current yields with a low energy consumption.

We have found that this object is achieved by the present invention by using an electrodialysis cell which is divided into three compartments by an anion exchange membrane and a cation exchange membrane and which is operated at temperatures of $\geq +70°$ to $\leq +110°$ C. and at current densities of from 2 to 15 $kA/m^2$ using an anion exchange membrane whose polymeric ion exchange matrix consists of a styrene/divinylbenzene copolymer having strongly basic, crosslinked, quaternary ammonium groups of the type R—CH$_2$—N(R$_3$)$_3^+$ and of a hydronium ion blocker.

The polymeric ion exchange matrix used is a styrene/divinylbenzene copolymer containing from 4 to 16, preferably from 6 to 8, % by weight of divinylbenzene. The polystyrene main chain may additionally be crosslinked, for example via polymethylene or polyethylene groups. The polymeric matrix preferably contains strongly basic, crosslinked, quaternary ammonium groups of the type R—CH$_2$—N(CH$_3$)$_3^+$.

The total capacity of the polymeric ion exchange matrix containing the strongly basic, crosslinked, quaternary ammonium groups should be from 1.4 to 1.6 meq/ml.

The blocking of the permeation of hydronium ions is obtained by the presence and the specific crosslinking of divinylbenzene. The divinylbenzene content should be completely crosslinked to a percentaqe degree which corresponds to twice the percentage proportion of divinylbenzene.

The hydronium ion blocker may comprise low molecular weight tertiary or secondary amines bonded within the ion exchange matrix to the strongly basic quaternary ammonium groups.

To improve the selectivity, the surface of the ion exchange layer or membrane containing the strongly basic charge-carrying quaternary ammonium groups may contain additional strongly basic quaternary ammonium groups in high concentration. These charge-carrying groups are produced for example with chloromethyl ether in the presence of aluminum chloride with and subsequent reaction with trimethylamine, causing a further cross-linking of the polymeric matrix surface via the methylene bridges and conferring an isoporic structure on the ion exchange surface.

The support fabric used for the polymeric ion exchange matrix is polypropylene or polyethylene, and the support fabric is bonded to the polymeric matrix with the aid of a crosslinked polyethylene, resulting in high temperature stability and selectivity.

In a particularly advantageous process for making the anion exchange membrane, a paste consisting of a mixture which contains, as the essential components, monomers with functional groups which are suitable for introducing ion exchange groups, crosslinkers and polymerization initiators and a fine polyethylene powder with a particle diameter of less than 10 $\mu$m is applied to a fabriclike substrate of polyethylene and polymerized to introduce the ion exchange groups thereafter.

The important requirement with this process is that the paste is prepared by adding a fine spherical polyethylene powder having a particle diameter of less than 10 $\mu$m to a mixture having as main components monomers with functional groups which are suitable for introducing ion exchange groups, crosslinkers and polymerization initiators. This is because, according to the present invention, the use of a fine spherical polyethylene powder having a particle diameter of less than 10 $\mu$m makes possible a mixture of usually 25–200% by weight, based on a certain monomer mixture. The mixture can then be obtained as a viscous and ropy paste which is applied uniformly to a fabriclike substrate of polyethylene serving as reinforcement.

A paste of monomers which contains a high proportion of such a fine polyethylene powder is applied uniformly to a fabriclike substrate of polyethylene and polymerized. This results in a composition with an islands in the sea structure, where the fine polyethylene powder is the sea and the ion exchange parts formed are the islands. Parts having the islands in the sea structure formed from the presence of a large proportion of fine polyethylene powder show good adhesion, since they readily become thermofused to the substrate of polyethylene.

Such anion exchange membranes are preferably fabricated as follows: 70 parts by weight of fine polyethylene powder of low density (flow beads LE-108, trademark) having a melting point of 110° C. and a spherical shape with an average particle diameter of 7 $\mu$m are added to 70 parts by weight of chloromethylstyrene, 15 parts by weight of divinylbenzene, 2 parts by weight of benzoyl peroxide and 2 parts by weight of NBR rubber. The resulting paste is then applied to a reinforcing fabric of 100 mesh of high density polyethylene, covered with a Tetoron film (made of polyester from Teijin) as peel-off material and polymerized at 105° C. for 8 hours.

The membranelike macromolecular polymer obtained is aminated in an aqueous solution of 10% by weight trimethylamine and 20% by weight of acetone to obtain in this way a particularly highly suitable anion exchange membrane having an electrical resistance of 6.2 $\Omega/cm^2$.

To protect the anion exchange membrane from fouling and to further improve the selectivity, the anion exchange side in the central compartment may be covered with a further anion exchange layer or membrane containing tertiary or secondary amino groups. These tertiary or secondary amino groups are preferably $R—CH_2—N(CH_3)_2$ or $R1'NH(CH_2CH_2NH)_n$ groups.

The electrolysis of the alkali metal sulfate takes place at temperatures of $\geq +70°$ C. to $\leq +150°$ C., preferably at temperatures of from $+80°$ C. to $+95°$ C. The current densities must be more than 1.5 $kA/m^2$ in order that high sulfuric acid and sodium hydroxide concentrations can be achieved at high current yields. A suitable current density range for the reaction is from 2 to 15 $kA/m^2$, preferably from 3 to 10 $kA/m^2$.

The pH in the central compartment, which contains the sodium sulfate, during the electrolysis should be within the range from $\geq 0.5$ to $\leq 8$, preferably from 4 to 7.5.

The electrode materials used are preferably perforated materials which are configured for example in the form of networks, lamellae, oval profile webs or round profile webs.

The oxygen overvoltage of the anodes at the claimed current density should be less than 400 mV to prevent the formation of ozone and per-compounds in the sulfuric acid anolyte and thereby oxidation of the anion exchange membrane.

Suitable anode materials of low oxygen overvoltage for the anolyte, which contains sulfuric acid, are for example titanium supports which contain electroconductive interlayers of borides and/or carbides and/or silicides of subgroups IV to VI or tin oxides or tantalum and/or niobium with or without platinum metal doping, and which are doped at the surface with electroconductive, nonstoichiometric mixed oxides of valve metals of subgroups IV to VI of the periodic table and metals or metal oxides of the platinum group or platinum metal compounds, for example platinates. Preference is given to mixed oxides of tantalum-iridium, tantalum-platinum and tantalum-rhodium and also to platinates of the type $Li_{0.3}Pt_3O_4$. To enlarge the surface area, the titanium support may be surface roughened or macroporous.

The cathodes are made of electrode materials having a low hydrogen overvoltage in order that additional voltage losses in the electrodialysis cell be avoided. Suitable cathodes are for example iron or nickel supports surface coated with finely divided cobalt, nickel, molybdenum, tungsten, manganese, Raney metal compounds of nickel or cobalt or nickel-iron alloys or cobalt-iron alloys containing from 65 to 90% by weight of iron.

To reduce the voltage loss on the central compartment of the electrodialysis cell, the distance between the cation exchange membrane and the anion exchange membrane should not be more than 5 mm. The distance between membranes is advantageously from 2.5 to 3.5 mm.

In the central compartment, the alkali sulfate concentration can be within the range from 0.5% by weight to the saturation limit. Preference is given to alkali metal sulfate contents of from 10% by weight to saturation. The alkali metal sulfate used is preferably the sulfate of sodium or of potassium.

To improve the selectivity and the membrane life, the sodium sulfate solution may have added to it from 0 001 to 2% by weight of ammonia or of a primary, secondary or tertiary amine, for example having alkyl of from 1 to 4 carbon atoms on the nitrogen atom, which may also be substituted by hydroxyl or alkoxy. Suitable amines are for example trimethylamine and triethylamine. It is also possible to use cyclic amines, such as aminoethylmorpholine, aminoethylpyrrolidine or cyclohexylamine, and also polyamines which are obtainable by reacting amines with ethyleneimine.

Preference is given to using volatile amines or those amines which, owing to their molecular size, cannot migrate through the cation exchange membrane, resulting in pure alkali metal hydroxide solutions to be obtained without technical complication.

The cation exchange membranes used are preferably polymers based on perfluorinated olefins, copolymers of tetrafluoroethylene with unsaturated perfluorinated ethers, and copolymers of styrene and divinylbenzene where the charge-carrying groups are sulfo and carboxyl or only sulfo groups. Preference is given to using membranes which contain only sulfo groups, since they are significantly more stable to fouling by multivalent cations.

To increase the total yield of the electrolysis of an alkali metal sulfate, it is expedient to utilize the thermal energy produced by the ohmic voltage loss in the electrodialysis cell for concentrating the acid and the alkali. This can be achieved for example by lowering the water vapor partial pressures in the anolyte and catolyte gas spaces, or by means of downstream vacuum evaporators, preferably a multistage evaporation unit. The water vapor partial pressures can be lowered for example by freeing some of the gas produced at the anode or cathode from the water vapor and recirculating it.

The process according to the present invention is suitable in particular for working up aqueous sodium sulfate solutions having a sodium sulfate content of $\geq 10\%$ by weight. The electrolytic process in the three-compartment electrodialysis cell is substantially impervious to organic or inorganic contaminants in the alkali metal sulfate solution by virtue of using an anion exchange layer or membrane with tertiary or secondary amino groups on the anion exchange side in the central compartment and through the use of small amounts of ammonia or amines in the $Na_2SO_4$-containing electrolyte of the central compartment.

EXAMPLE 1

A three-compartment electrodialysis cell is equipped with an anode and a cathode each 1 dm$^2$ in electrode area. The anode used is an oval profile support with an individual web diameter of 2.5 mm and a web spacing of 1 mm. The surface of the titanium support comprises a plasma-deposited alloy of 40% by weight of tantalum, 58.5% by weight of tungsten and 1.5% by weight of iron, which has been doped with a tantalum-iridium mixed oxide. The cathode has the same shape as the anode and is made of a low-carbon iron. To reduce the hydrogen overvoltage, a plasma burner was used to apply an alloy of 80% by weight of iron and 20% by weight of nickel to the iron surface. The anode compartment, in which the sulfuric acid is produced, is separated by an anion exchange membrane from the central compartment, containing the alkali metal sulfate solution. The anion exchange membrane used is a styrene/divinylbenzene copolymer containing 6% by weight of divinylbenzene and crosslinked quaternary ammonium groups of the type $R-N(CH_3)_3^{30}$ and also a crosslinked polyethylene support layer with an islands in the sea structure. The total degree of crosslinking within this membrane is about 12%. This ion exchange membrane additionally contains low molecular weight amino groups of the type $R-N(CH_3)_2^+$ as hydronium ion blockers. On the ion exchange side of the central compartment is a further anion exchange membrane containing amino groups of the type $RNH(CH_2CH_2NH)_n^+$ as charge-carrying groups. The cation exchange membrane used is a polymer based on perfluorinated olefins containing sulfonic acid groups (from Du Pont, Type 324).

The distance between the anion exchange membrane and the cation exchange membrane in the central compartment is 2.5 mm. The anode and the cathode each rest directly on, respectively, the cation exchange membrane and the anion exchange membrane. The anode and cathode compartments of the electrodialysis cell each possess a system of natural circulation for the anolyte and the catolyte respectively. The central compartment is visited by the recirculating alkali metal sulfate solution via a reservoir vessel which can be replenished with sodium sulfate.

At the start of the electrodialysis, the anolyte cycle is charged with 2.5% strength by weight sulfuric acid, the catolyte cycle with 2.5% strength by weight sodium hydroxide solution and the central compartment cycle with 32% strength by weight aqueous sodium sulfate solution containing 0.05% by weight of ammonia.

The operating conditions during the electrodialysis are as follows:

Current density: 3 kA/m$^2$
Cell voltage: 4.5–4.3V
Temperature: 82°–85° C.

In addition, the acid-containing anolyte and the catolyte are fed separately to a vacuum evaporator. In this way the excess heat energy produced in the course of the electrodialysis is utilized for further concentrating the acid and the alkali. The experimental conditions described give the following current yields in batch operation as a function of the stated final acid and final alkali concentrations:

| Current yield % | NaOH concentration % | H$_2$SO$_4$ concentration % |
| --- | --- | --- |
| 80 | 25–28 | 38–40 |
| 70 | 36–38 | 55–57 |
| 60 | 42–43 | 66–68 |

The sodium content of the sulfuric acid is $\leq 30$ ppm and the sulfate content of the sodium hydroxide solution is $\leq 20$ ppm.

The electrolysis can also be carried out as a continuous process. In this case from 6 to 8 individual cell units are combined into one cascade stage. In the cascade, the acid and the alkali are passed counter-currently to the sodium sulfate solution to obtain the same results as in the batch process.

If the electrodialysis is carried out under the same conditions not at from $+82°$ to $+85°$ C. but at $+40°$ C., the following results are obtained:

| Current yield % | NaOH concentration % | H$_2$SO$_4$ concentration % |
| --- | --- | --- |
| 80 | ~12 | ~17 |
| 70 | ~19 | ~26 |
| 60 | ~22 | ~32 |

COMPARATIVE EXAMPLE

The two anion exchange membranes are replaced by commercial styrene/divinylbenzene copolymer which contains only $R-N(CH_3)_2(C_2H_4OH)+$ groups as strongly basic groups and the electrodialysis is carried out at $+40°$ C. under the same conditions as indicated above, affording the following acid and alkali concentrations as a function of the current yield:

| Current yield % | NaOH concentration % | H$_2$SO$_4$ concentration % |
| --- | --- | --- |
| 80 | ~8 | ~4 |
| 70 | ~12 | ~8 |
| 60 | ~18 | ~12 |

Use of these membrane grades at above 50° for the purpose of obtaining better current yields is not possible, since the charge-carrying polymeric matrix is bonded to the support fabric via polyvinyl chloride.

We claim:

1. In a process for the electrolysis of an alkali metal sulfate to sulfuric acid and an alkali metal hydroxide, which comprises: providing a three-compartment electrodialysis cell which contains an anode compartment, a cathode compartment, and a central compartment separating the anode compartment from the cathode compartment; separating the anode compartment from the central compartment by an anion exchange membrane; separating the cathode compartment from the central compartment by a cation exchange membrane; introducing a feed composition comprising an aqueous solution of an alkali metal sulfate into the central compartment; performing electrodialysis which results in thermal energy production as a result of ohmic voltage loss; and collecting as a discharge an alkali metal hydroxide in the cathod compartment and sulfuic acid in the anode compartment, the improvement comprising a) performing the electrodialysis step at a temperature between 70° and 150° C. and a current density of between 0.5 and 15 KA/m$^2$, b) the anion exchange membrane contains a polymeric ion exchange matrix which consists of a styrene/divinylbenzene copolymer having strongly basic crosslinked quaternary ammonium groups of the formula $R-CH_2N-(R^3)_3^+$ and a hydronium ion blocker, and c) the anion exchange membrane has on the central compartment side a further anion exchange layer or membrane which contains tertiary or secondary amino groups.

2. A process as claimed in claim 1, wherein the strongly basic, charge-carrying groups $R-CH_2N(R_3)_3^+$ of the anion exchange membrane are $R-CH_2-N(CH_3)_3^+$.

3. A process as claimed in claim 1, wherein the electrode materials used are perforated and rest directly on the ion exchange membrane surfaces.

4. A process as claimed in claim 1, wherein the oxygen overvoltage of the anode used is less than 400 mV within the claimed current density range.

5. A process as claimed in claim 1, wherein the distance between the cation exchange membrane and the anion exchange membrane in the central compartment is 5 mm.

6. A process as claimed in claim 1, wherein the alkali metal sulfate solution used in the central compartment has a concentration within the range from 10% by weight to saturated.

7. A process as claimed in claim 1, wherein the concentration of alkali metal hydroxide and sulfuric acid in the feed is from 0.2 to 5% by weight and in the discharge respectively is from 25 to 40% by weight and from 30 to 70% by weight.

8. A process as claimed in claim 1, wherein the alkali metal sulfate solution has added to it from 0.001 to 2% by weight of ammonia or of a primary, secondary or tertiary amine having alkyl of from 1 to 4 carbon atoms on the nitrogen atom, which may also be substituted by hydroxyl or alkoxy.

9. A process as claimed in claim 1, wherein the thermal energy produced by the ohmic voltage loss in the electrodialysis cell is utilized for concentrating the sulfuric acid and the alkali metal hydroxide solution.

* * * * *

UNITED STATES PATENT AND TRADEMARK OFFICE
CERTIFICATE OF CORRECTION

PATENT NO. : 5,258,106

DATED : Nov. 2, 1993

INVENTOR(S) : HABERMANN et al.

It is certified that error appears in the above-identified patent and that said Letters Patent is hereby corrected as shown below:

On the Title Page, Item [57];
IN THE ABSTRACT, line 4, before "150°C" the " $\geq$ " should be -- $\leq$ --.

IN THE CLAIMS, claim 5, column 8, line 18, before "5 mm" insert -- $\leq$ --.

Signed and Sealed this

Tenth Day of May, 1994

Attest:

BRUCE LEHMAN

Attesting Officer     Commissioner of Patents and Trademarks